C. QUINN.
JAR OPENER.
APPLICATION FILED NOV. 19, 1920.
1,389,011.  
Patented Aug. 30, 1921.
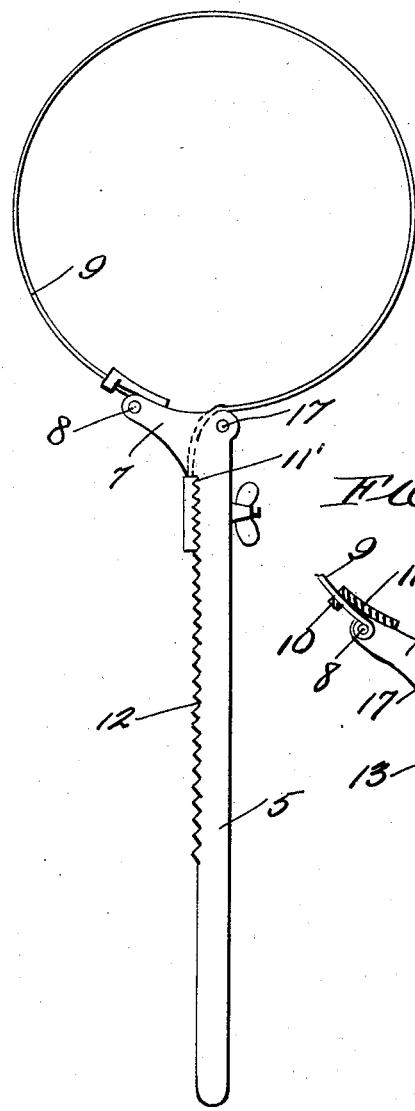
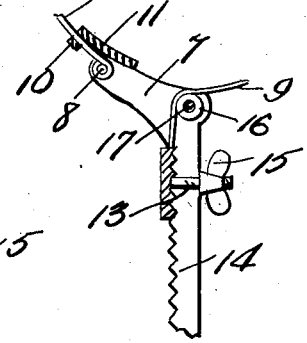
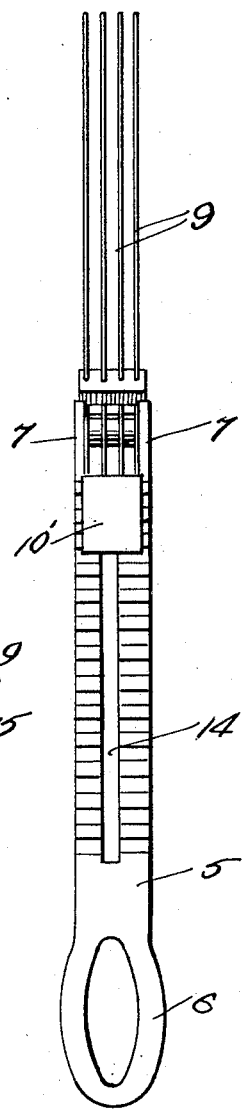
INVENTOR.  
Cornelius Quinn

UNITED STATES PATENT OFFICE.

CORNELIUS QUINN, OF DENVER, COLORADO.

JAR-OPENER.

1,389,011.  Specification of Letters Patent.  Patented Aug. 30, 1921.

Application filed November 19, 1920. Serial No. 425,122.

*To all whom it may concern:*

Be it known that I, CORNELIUS QUINN, a citizen of the United States, residing at Denver, in the county of Denver and State of Colorado, have invented certain new and useful Improvements in a Jar-Opener, of which the following is a specification.

My invention relates to a tool for removing the lids of jars or the like.

An important object of the invention is to provide a device of the above mentioned character, which will unscrew or remove the lid in a convenient manner, without liability of injury to the lid, and which is adjustable for engaging lids of different sizes.

In the accompanying drawings forming a part of this specification, and in which like numerals are employed to designate like parts throughout the same, Figure 1 is a side elevation of a tool embodying my invention, Fig. 2 is a plan view of the same, and, Fig. 3 is a detail section.

In the drawings, the numeral 5 designates a handle, provided with a hand-grip 6, at its rear end. At its forward end the handle 5 has a pair of spaced ears 7, extending laterally, as shown.

A transverse pin 8 connects the ears 7 and has connection with spaced wires 9, adapted to encircle the lid. The wires 9 extend through an apertured flange 10, of a guard 11, preferably formed of rubber, and positioned between the ears 7 and the lid, to prevent injury to the latter.

The opposite ends of the wires 9 are connected with a block or member 10', having teeth or serrations 11', to engage teeth 12 upon one side of the handle. A bolt 13 is secured to the block 10' and operates through a longitudinal slot 14, and carries a winged nut 15. The wires 9 pass over a roller 16, pivoted upon a pin 17, carried by the ears 7.

In the use of the device, the winged nut 15 may be manipulated so that the block 10' may be longitudinally adjusted, and locked in adjustment, so that the wires 9 will properly fit about the selected lid. When the wires surround the lid, the turning movement of the handle 5, in the proper direction, will clamp the wires to the lid, and turn the lid.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. A tool of the character described, comprising a handle provided upon one side with teeth and having a longitudinal slot and a pair of spaced ears at its forward end, a flexible element connected with the outer ends of the ears, a block connected with the opposite end of the flexible element and having teeth to engage the first named teeth, a bolt connected with the block and extending through the longitudinal slot and carrying a clamp nut, and a roller pivoted between the ears and engaging the flexible element.

2. A tool of the character described, comprising a handle provided upon one side with teeth and having a longitudinal slot and a pair of spaced ears at its forward end, a pin connecting the free ends of the ears, a plurality of wires secured to the pin, a block having teeth and attached to the opposite ends of the wires, a clamping bolt secured to the block and extending through said opening, and an element carried by the ears and engaging said wires.

3. A tool of the character described, comprising a handle having a pair of laterally extending ears, a pin connecting the ears, a plurality of wires secured to the pin, a fibrous guard arranged upon the inner side of the ears and having an apertured flange to receive the wires, and adjustable means for connecting the opposite ends of the wires with the handle.

In testimony whereof, I have affixed my signature in the presence of two witnesses.

CORNELIUS QUINN.

Witnesses:
REXFORD FANCHER,
JOHN C. LARKIN.